UNITED STATES PATENT OFFICE.

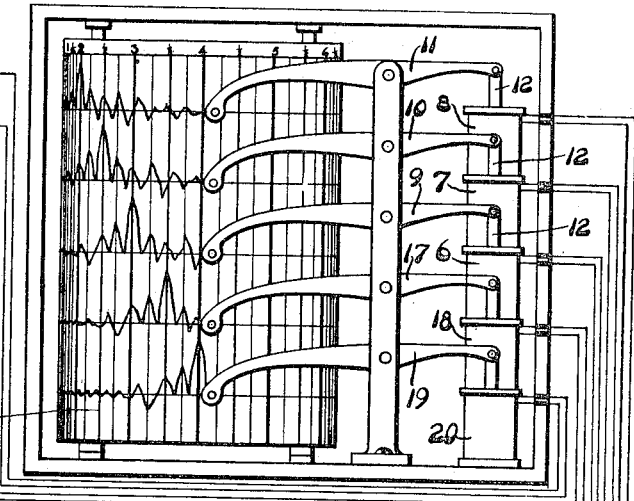
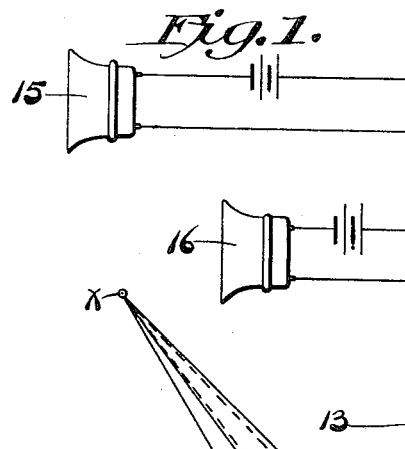
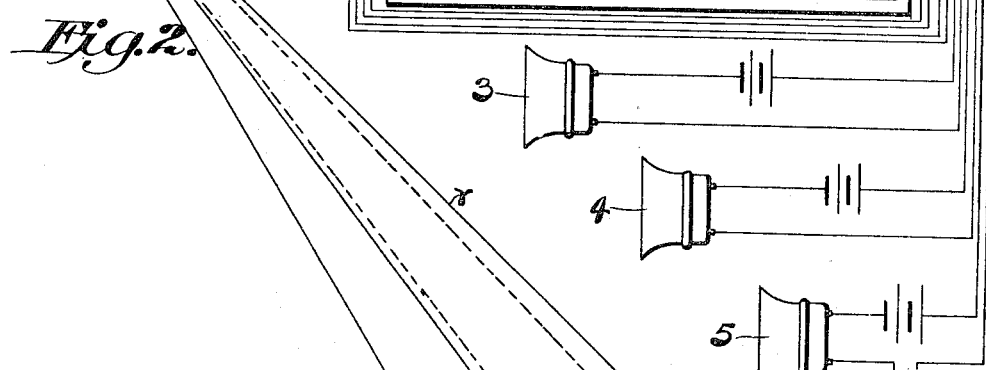
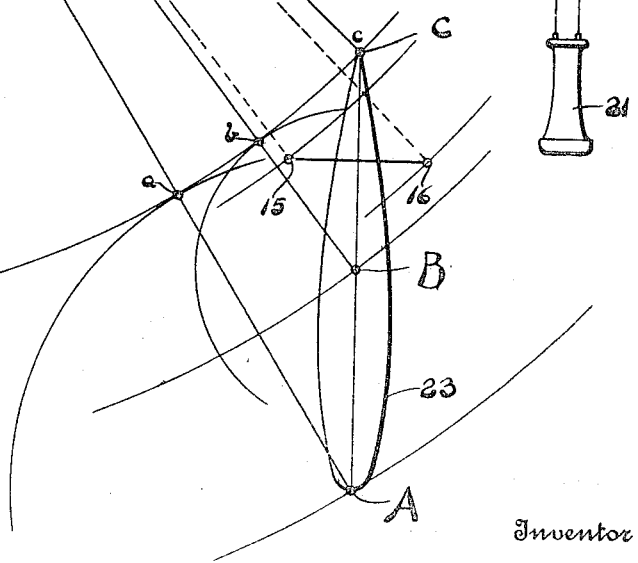
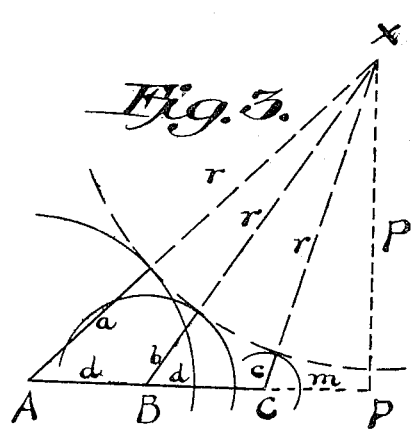

HENRY J. FURBER, JR., OF CHICAGO, ILLINOIS.

METHOD FOR LOCATING SOUNDS.

1,149,976. Specification of Letters Patent. Patented Aug. 10, 1915.

Application filed March 4, 1911. Serial No. 612,364.

*To all whom it may concern:*

Be it known that I, HENRY J. FURBER, Jr., a citizen of the United States of America, and resident of Chicago, county of Cook, and State of Illinois, have invented a certain new and useful Method for Locating Sounds, of which the following is a specification.

An object of this invention is to produce a method for ascertaining the point of location of a source of sound.

A further object is to produce a new and improved method of determining the position of a source of sound or vibratory impulses, by measuring the periods of time intervening between the arrival, at three different points of known location, of a sound or vibratory impulse, emanating from the source.

In carrying out my invention, I employ the principle that sound radiating from its source, reaches different points at the expiration of intervals of time, which are severally proportional to the distances of the different points from the source of sound and the known rapidity of propagation in the conducting medium or media.

The invention consists in determining the respective moments at which sound, emanating from some source, reaches different established points, measuring the difference in time at which the sound arrives at said different points and employing the data thus obtained in computing the location of the source of sound.

In the drawings accompanying this application, and forming a part thereof, Figure 1 is a diagrammatic view of apparatus embodying my invention and employed in recording the time at which sound is received at different established points. Fig. 2 is a geometric diagram, graphically illustrating the principles employed in the mathematical computation utilized in determining the distance and direction of the source of sound from established points of location. Fig. 3 is a trigonometrical diagram for use in solving the equations utilized by applicant.

The apparatus illustrated and employed in carrying out the method herein described as an embodiment of my invention, includes three receivers, 3, 4 and 5, which may be similar in construction to telephone transmitters, and are preferably, for the purpose of simplifying computation, located in a straight line and at known distances apart, as indicated at B, C, and A in Fig. 2. Each receiver preferably consists of a diaphragm, which is so arranged that it varies the amount of resistance in an electric circuit, by its fluctuations or vibrations, each receiver being located in an electric circuit, and each circuit including an electro-magnet or solenoid, which actuates the recording diaphragm, not shown.

In the drawings, the receiver 3 is located in the same circuit with the solenoid 6, and the receivers 4 and 5 are respectively located in the circuits of solenoids 7 and 8. Each circuit includes a source of electricity, such as a battery. The solenoids 6, 7 and 8, respectively, actuate pivotally mounted recording arms 9, 10 and 11, through the agency of the recording diaphragms referred to, which fluctuate or vibrate in response to variations in the current passing through the windings of the controlling solenoids. Each arm is connected to its operating diaphragm by means of a link 12, and is provided at its free end with a recording pen, adapted to bear against a moving chart. The chart consists of a strip of paper 13, graduated to indicate time units, such, for example, as seconds, and fractions of seconds, and the strip is driven at a uniform and determined speed by means of a clock mechanism, not shown. The purpose of this apparatus is to record the time at which sound reaches the different receivers 3, 4 and 5.

Each vibration of the receiving diaphragm will cause a corresponding vibration of the recording diaphragm and under these conditions, the free ends of the recording arms will reciprocate in response to vibrations of the receiving diaphragms, and will vary in accordance with variations in the intensity of the sound at the receivers.

The invention consists in ascertaining the difference in time at which a sound, emanating from an unknown point, reaches the different receivers 3, 4 and 5, which are respectively located at the established points C, B and A, and then in computing mathematically the position of the point of origin of the sound.

Referring to Fig. 2: Sound emanating from some unknown point of origin, such as X, advances in any certain medium in all directions at known velocity, and it may be said in concentric circles, and successively reaches the points C, B and A. The difference in the periods of elapsed time which it requires for a certain sound, originating at the unknown source X, to reach successively the points C, B or A, is capable of being represented by lengths of the several radii Cc, Bb and Aa, the center of whose circles are respectively at C, B and A. The velocity of sound in any certain medium is known, and, consequently the lengths of those radii are known quantities and may be respectively designated by $a$, $b$ and $c$. In every actual case, one of the three known radii, and possibly two, will be equal to zero. In Fig. 2, the radius Cc equals zero. Assuming that these centers are located at equal known distances apart along a straight line, the problem thus resolves itself to this: Given, three circles of known radii, whose centers are located at equal and known distances apart, along a straight line, find the radius $r$ and center X of a circle which is tangent to all three of the known circles.

For simplicity, I refer to Fig. 3, which is a geometric diagram corresponding to Fig. 2. In the diagram the known quantities are the lengths of the lines Aa, Bb and Cc, which are respectively marked $a$, $b$ and $c$. The distance $d$, that is the distance between adjacent receivers, is also known. One object of the computation is to find the length of $r$, the radius of the unknown circle having its center at X, and the diagram shows the points A, B and C joined with the point X by means of the respective lines AX, BX and CX. The perpendicular $p$ which passes through the point X is erected on the base line AC, produced, and for convenience the portion of the line between the points C and the point P, at which the perpendicular intersects the production of the base line, is marked $m$. The angle APX is a right angle and is common to the triangles CPX, BPX and APX, hence:—

I. In the right angle triangle CPX $$(c+r)^2 = p^2 + m^2. \quad c+r = CX.$$

II. In the triangle BPX $$(b+r)^2 = p^2 + (m+d)^2,$$

in which $$(b+r) = BX; \text{ and } d+m = BP.$$

III. In the right angle triangle APX $$(a+r)^2 = p^2 + (m+2d)^2,$$

in which $$a+r = AX; \text{ and } (m+2d) = AP.$$

IV. Subtract equation II from equation III $$(a+r)^2 - (b+r)^2 = 2md + 3d^2.$$

V. Subtract equation I from equation III $$(a+r)^2 - (c+r)^2 = 4md + 4d^2.$$

VI. Multiply equation IV by 2

$$2(a+r)^2 - 2(b+r)^2 = 4md + 6d^2.$$

VII. Subtract equation V from equation VI $$(a+r)^2 + (c+r)^2 - 2(b+r)^2 = 2d^2.$$

VIII. Expanding equation VII $$a^2 + 2ar + c^2 + 2cr - 2b^2 - 4br = 2d^2$$

IX. Transposing equation VIII $$2ar + 2cr - 4br = 2d^2 + 2b^2 - a^2 - c^2$$

X. Dividing equation IX by $2(a+c-2b)$ $$r = \frac{2d^2 + 2b^2 - a^2 - c^2}{2(a+c-2b)}$$

When the value $r$ has been determined, the sides and angles of the triangle CAX, or of any of the triangles whose apexes are X and whose bases lie within the line AC, can be easily determined, and the distance and angle of the point X from any point on the line 3', 4' and 5' of the receivers may be established.

It will be observed that while the angle and the distance of X from all points in the line C, B and A can readily be computed by the computation above described, it is not thereby determined upon which side of the line AC the point X is located. To determine this, I preferably provide two additional receivers 15 and 16, located on opposite sides of the line C, B and A, and at equal distances from it. When a sound originates on one side of the line, it reaches the receiver 15 first and is indicated by the arm 17, which is actuated through the agency of an electric circuit and a solenoid 18. This will readily indicate that the sound originated on the side of the line on which the receiver 15 is located. When the sound originates on the other side of the line, it reaches the receiver 16 first and is indicated by the arm 19, which is located in an electric circuit with the receiver 16, and is actuated by a solenoid 20 and a magnetically controlled diaphragm. With this arrangement, it can readily be determined on which side of the line the origin of the sound is located.

The recording arms 9, 10, 11, 17 and 19 will be constantly vibrating, if the receivers controlling them are sufficiently sensitive, and they will consequently trace zig zag or wavy lines on the chart. Each sound to which the receivers are subjected, will cause a characteristic vibration of the arms, from which any certain sound may be graphically distinguished from all others. These maximum and minimum points may readily be distinguished on the chart, and the difference in time between the reception of such a maximum vibration by one of the receivers and the others will be readily indicated on the chart, and can be determined by measurements or by the graduations on the chart. For example, the stroke of a bell would set up vibrations in the receivers, which might be recorded, as indicated in Fig. 1.

I contemplate employing my invention in navigation, for the purpose of aiding in directing the course of ships during foggy weather, or when it is impossible to employ visual signals. The receivers may be located on shipboard, as for example at known distances apart on the deck of a vessel 23, or means may be provided for locating one or more of the receivers on suitable receptacles, which may be towed behind the vessels. Such a procedure would increase the length of the base line 3', 4' and 5', and would contribute to the accuracy of the results. The receivers 15 and 16 are preferably located at each side of the ship, or extended from the two sides of the ship by means of gaffs. If desired, all or some of the receivers may be submerged, so that the water or air and water may be employed as the medium or media through which the sound is transmitted.

In addition to employing my invention in ascertaining the point of location of a source of sound, I may also employ it in determining the position of an instrument sending wireless telegrams. The receivers would of necessity be different from those employed in ascertaining the position of a source of sound, but the same recording apparatus and the same methods of procedure may be employed, wherever the travel of the waves is measurable.

In Fig. 1, I have shown a telephone receiver 21 located in the circuit of the sound receiver 5 and the solenoid 8. The purpose of employing this instrument is that the observer may be aided in determining the nature of the sound by hearing it. Each sound to which the receivers are subjected will cause the recording arms to trace characteristic lines on the strip 13. A chart indicating the character of lines which various sounds will cause the recording arms to trace on the strip may be provided, for the purpose of aiding the observer in determining the character of the sound affecting the receivers. This chart could be produced prior to the installation of the apparatus, by subjecting the apparatus to different known sounds, and then making a permanent record of the lines traced by the recording arms, and noting on the record the nature and quality of the sound which each wave line indicates. With such a chart the observer could compare the wave produced on the strip of paper 13 with the chart and determine the character of the sound, without the aid of the telephone receivers 21.

In accordance with the United States patent statutes, I have described a method, and described and illustrated apparatus embodying my invention, but I desire it to be understood that other methods and apparatus may be employed, without departing from the spirit and scope of my invention.

What I claim is:—

1. A method of determining the point of location of a source of sound, which comprises locating sound receivers at known distances apart, determining the time that the sound is received by different receivers, determining the differences between the times of reception of the sound at the different receivers, and employing the differences in calculating the distance and direction of the point of location of the sound from the point of location of the receivers.

2. A method of determining the point of location of a source of sound, which comprises locating three receivers in a straight line, and a receiver on each side of the line, and determining the time that a sound from the source reaches each receiver.

3. A method of determining the point of location of a source of vibratory impulses, which comprises locating receivers at determined distances apart, determining the times at which the vibrations resulting from a single vibratory impulse arrive at each receiver, measuring the periods intervening between the reception of the vibrations at different receivers, and employing the lengths of said periods and the distances between the receivers in computing the position of the source of vibratory disturbance.

4. A method of determining the point of location of a source of sound, which comprises locating three receivers at known distances apart and in a straight line, determining the time at which sound waves initiated by a single vibratory impulse at said source arrive at the different receivers, measuring the length of the periods of time intervening between the arrival of the sound waves at the different receivers and then computing the position of the source of sound by employing the rate of travel of the sound waves through the intervening medium, the distance between the receivers and the lengths of the intervening periods.

HENRY J. FURBER, Jr.

Witnesses:
 FRED WASCHKE,
 NELLIE CARLSON.